(12) United States Patent
Tarlton (10) Patent No.: US 7,431,140 B2
(45) Date of Patent: Oct. 7, 2008

(54) COMBINING CONVEYOR WITH PRODUCT PATH SWITCHING ARRANGEMENT

(75) Inventor: Curtis S. Tarlton, Union, NJ (US)

(73) Assignee: Nedco Conveyor Company, Union, NJ (US)

( * ) Notice: Subject to any disclaimer, the term of this patent is extended or adjusted under 35 U.S.C. 154(b) by 0 days.

(21) Appl. No.: 11/655,049

(22) Filed: Jan. 17, 2007

(65) Prior Publication Data

US 2007/0209905 A1 Sep. 13, 2007

Related U.S. Application Data

(60) Provisional application No. 60/781,965, filed on Mar. 13, 2006.

(51) Int. Cl.
*B65G 47/46* (2006.01)
(52) U.S. Cl. ................................. 198/370.02; 198/890
(58) Field of Classification Search ................ 198/890, 198/890.1, 370.01, 370.02, 370.03, 370.08
See application file for complete search history.

(56) References Cited

U.S. PATENT DOCUMENTS

| | | | | |
|---|---|---|---|---|
| 5,131,522 A | * | 7/1992 | Fujio | 198/370.02 |
| 5,135,100 A | * | 8/1992 | Cotter et al. | 198/370.02 |
| 5,217,105 A | * | 6/1993 | Sapp et al. | 198/370.02 |
| 5,275,273 A | * | 1/1994 | Veit et al. | 198/890 |
| 5,333,715 A | * | 8/1994 | Sapp | 198/370.02 |
| 5,927,466 A | * | 7/1999 | Rowley | 198/370.03 |
| 6,390,274 B1 | * | 5/2002 | Snedecor | 198/370.02 |
| 6,615,972 B2 | * | 9/2003 | Veit et al. | 198/370.02 |
| 6,669,001 B1 | * | 12/2003 | Bromley et al. | 198/370.06 |

* cited by examiner

*Primary Examiner*—James R Bidwell
(74) *Attorney, Agent, or Firm*—Rohm & Monsanto, PLC (57) ABSTRACT

A combiner conveyor arrangement for conveying articles of product has a first longitudinal conveyor for urging a plurality of the articles of product in parallel in a predetermined direction of travel. First and second bilateral guide ways urge the articles translongitudinally. A switching arrangement selects articles of product from between the first and second bilateral guide ways. A plurality of actuatable fingers block or open the first and second bilateral guide ways synchronously. A switching arrangement directs a product being conveyed to a selectable conveyance pathway, and has a gate that is pivotally displaceable between first and second positions in response to the conveyance of the product. A first spring applies a position restoration force and locking arrangement locks the gate. In a dual gate arrangement, a further pivotable gate has applied thereto a spring that is stronger than the first spring.

17 Claims, 8 Drawing Sheets

COMBINING CONVEYOR WITH PRODUCT PATH SWITCHING ARRANGEMENT

RELATIONSHIP TO OTHER APPLICATIONS

This application claims the benefit of the filing date of U.S. Provisional Patent Application Ser. No. 60/781,965 filed Mar. 13, 2006, the disclosure of which is incorporated herein by reference.

BACKGROUND OF THE INVENTION

1. Field of the Invention

This invention relates generally to conveyor systems and arrangements, and more particularly, to a combining conveyor arrangement.

2. Description of the Related Art

Articles are often supplied to a conveyor arrangement in batches without any specific organization at the input of the conveyor arrangement. It is desired that the articles be discharged from the conveyor arrangement in an organized single file. In this manner, the articles can efficiently be supplied to other equipment for continued processing.

If the articles are not organized at the discharge end of the conveyor arrangement, jamming will result and production efficiency will greatly be reduced. Jamming generally occurs when articles are discharged side-by-side, and become wedged. Such wedging can cause the articles to become reoriented, or a blocking bridge formed at the discharge end, and ultimately the discharge of product articles is precluded. Moreover, exit blockage will result in massive accumulation of the articles requiring total system shutdown.

It is, therefore, an object of this invention to provide a combiner conveyor arrangement that converts a batch feed of a plurality of articles of product arranged substantially in parallel into a single file discharge.

It is another object of this invention to provide a combiner conveyor arrangement that converts a single file feed of a plurality of articles of product into a parallel discharge.

It is also an object of this invention to provide a combiner conveyor arrangement that prevents wedging and bridging of the articles of product.

SUMMARY OF THE INVENTION

The foregoing and other objects are achieved by this invention which provides a combiner conveyor arrangement for conveying articles of product. In accordance with an apparatus aspect of the invention, the combiner conveyor arrangement is provided with a first longitudinal conveyor for urging a plurality of the articles of product substantially in parallel in a predetermined direction of travel. First and second bilateral guide ways urge the articles of product translongitudinally in response to the urging of the articles of product by the first longitudinal conveyor. Additionally, a switching arrangement for selecting articles of product from between the first and second bilateral guide ways.

In one embodiment of the invention, there is provided a second longitudinal conveyor for urging the articles of product serially in the predetermined direction of travel, the second longitudinal conveyor beings arranged in the vicinity of the switching arrangement.

In a further embodiment, the switching arrangement includes a plurality of actuatable fingers for selectably blocking and opening the first and second bilateral guide ways. The plurality of actuatable fingers are arranged to operate synchronously.

In a highly advantageous embodiment, the first and second bilateral guide ways each include laterally outer and inner guide ways.

The combiner conveyor arrangement of the present invention can be operated to combine the articles of product into a single file discharge, or to convert a single file of articles of product into plural parallel ranks. When employed to combine the articles of product into a single file discharge, the predetermined direction of travel of the first longitudinal conveyor is in a direction of convergence of the first and second bilateral guide ways. In such an embodiment, there is further provided a discharge conveyor for receiving the articles of product in single file arrangement downstream of the switching arrangement. Of course, when the combiner conveyor arrangement is operated to convert a single file of articles of product into plural parallel ranks, the discharge conveyor functions as an input conveyor.

In accordance with a method aspect of the invention, there are provided the steps of:

first urging the articles of product in substantially parallel relation to one another in a longitudinal direction of travel;

guiding the articles of product along first and second bilateral paths toward a region of convergence in response to the step of first urging; and switching between the first and second bilateral paths to form the single file discharge of articles of product.

In one embodiment of this method aspect of the invent, the step of switching includes the further step of actuating a plurality of fingers. In a further embodiment, the step of actuating a plurality of fingers includes the further step of actuating the plurality of fingers synchronously.

In accordance with a further apparatus aspect of the invention, there is provided a switching arrangement in a switching station of a conveyor for directing a product being conveyed to a selectable one of plurality of selectable conveyance pathways. The switching arrangement is provided with a gate disposed in the vicinity of the intersection of the selectable conveyance pathways, the gate being pivotally displaceable about a pivot point from a first position to a second position in response to the conveyance of the product being conveyed. Additionally, a locking arrangement locks the gate in a predetermined position.

In a highly advantageous embodiment of the invention, the locking arrangement is an electromagnet.

In a further embodiment, the gate is provided with a lobe portion for communicating with the product being conveyed.

A resilient biasing element restores the gate to the first position. Preferably, the resilient biasing element is a spring.

In an advantageous dual gate arrangement, there is further provided a further gate disposed in the vicinity of the intersection of the selectable conveyance pathways, The further gate is pivotally displaceable about a pivot point from a respective first position to a respective second position. A further resilient biasing element for restores the further gate to the respective first position. As was the case with the resilient biasing element associated with the first gate, the further resilient biasing element may be in the form of a spring, and is configured to apply a stronger resilient biasing force to the further gate than is applied by the first resilient biasing element to the first gate.

BRIEF DESCRIPTION OF THE DRAWING

Comprehension of the invention is facilitated by reading the following detailed description, in conjunction with the annexed drawing, in which.

DETAILED DESCRIPTION

Figure 1:
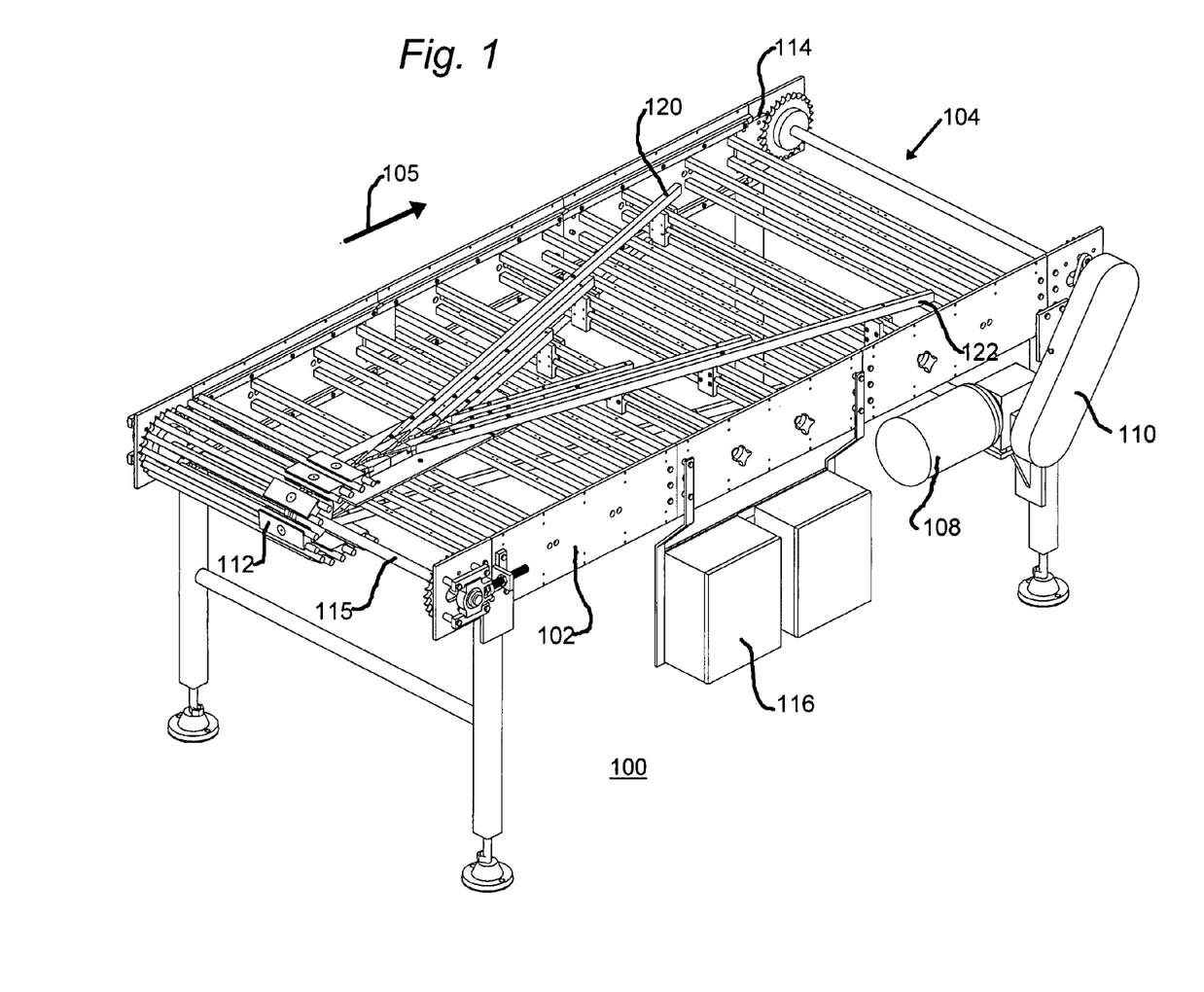
FIG. 1 is a simplified schematic isometric representation of a specific illustrative embodiment of the inventive combiner conveyor arrangement.

FIG. 1 is a simplified schematic isometric representation of a specific illustrative embodiment of an inventive combiner conveyor arrangement 100 constructed in accordance with the principles of the invention. As shown in this figure, combiner conveyor arrangement 100 is provided with a support chassis 102 on which is installed a longitudinal conveyor that is generally designated 104. In this specific illustrative embodiment of the invention, longitudinal conveyor 104 is operated as a single file to multi-lane system in the direction of arrow 105. In other embodiments, however, the combiner conveyor arrangement can be operated in the opposite direction, as herein described.

Longitudinal conveyor 104 is shown to be driven by a motor 108 that is coupled to the longitudinal conveyor by a drive 110. In this embodiment, conveyor elements 112 are driven by a chain 114 continuously about an axle 115. For sake of clarity of the depiction, not all of the conveyor elements are shown. The operation of the combiner conveyor arrangement is controlled by a controller 116.

In addition to the foregoing, FIG. 1 shows bilateral guide ways 120 and 122 that are shown to be directed toward divergence in the direction of arrow 105.

Figure 2:
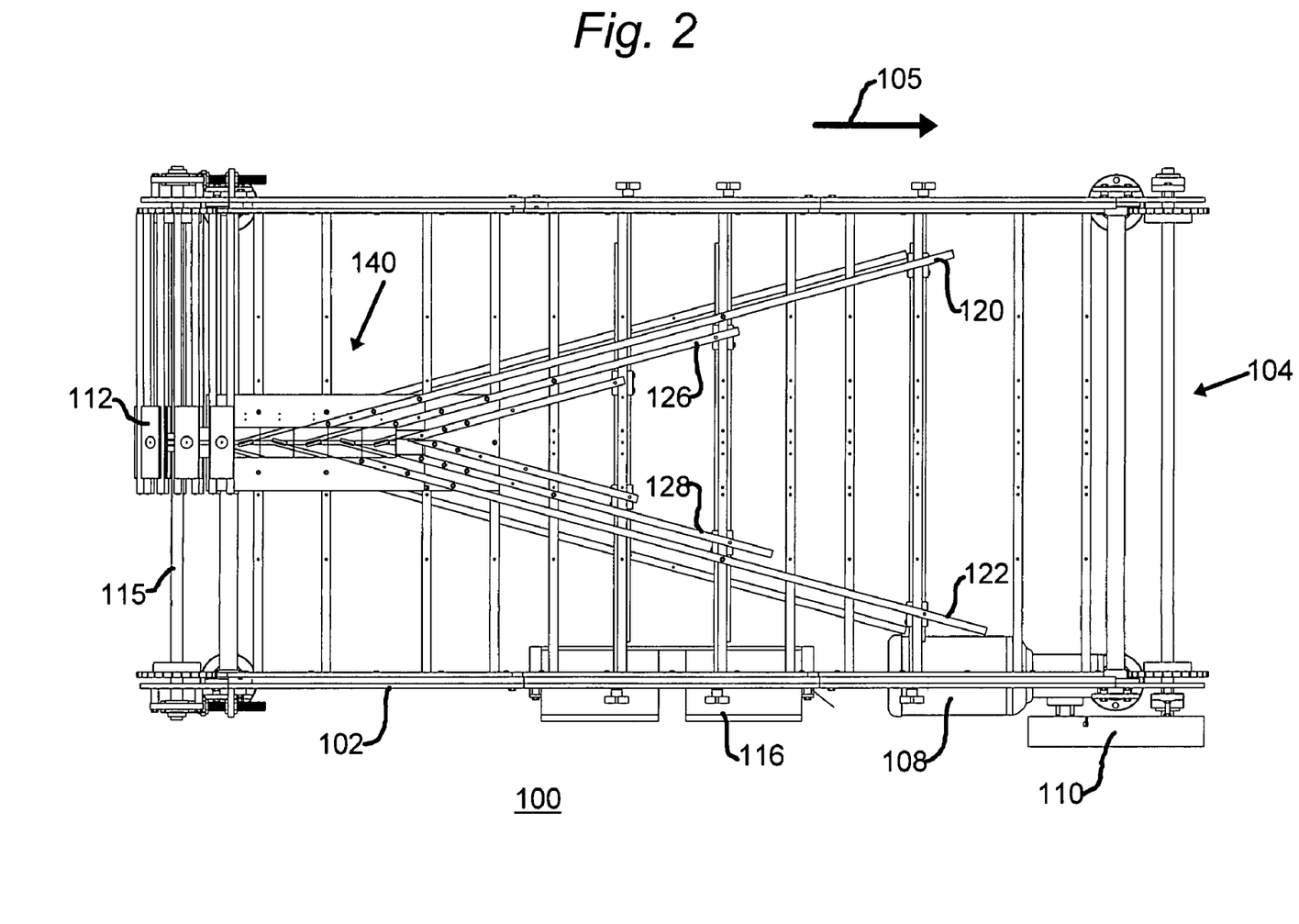
FIG. 2 is a simplified schematic top plan representation of the combiner conveyor arrangement of FIG. 1.

FIG. 2 is a simplified schematic top plan representation of combiner conveyor arrangement 100. Elements of structure that have previously been discussed are similarly designated. There are additionally shown inner guide ways 126 and 128. As is the case with guide ways 120 and 122, the inner guide ways are directed toward divergence in the direction of arrow 105. Guide ways 120 and 122, as well as inner guide ways 126 and 128, converge toward a combiner portion 140 of combiner conveyor arrangement 100.

Figure 3:
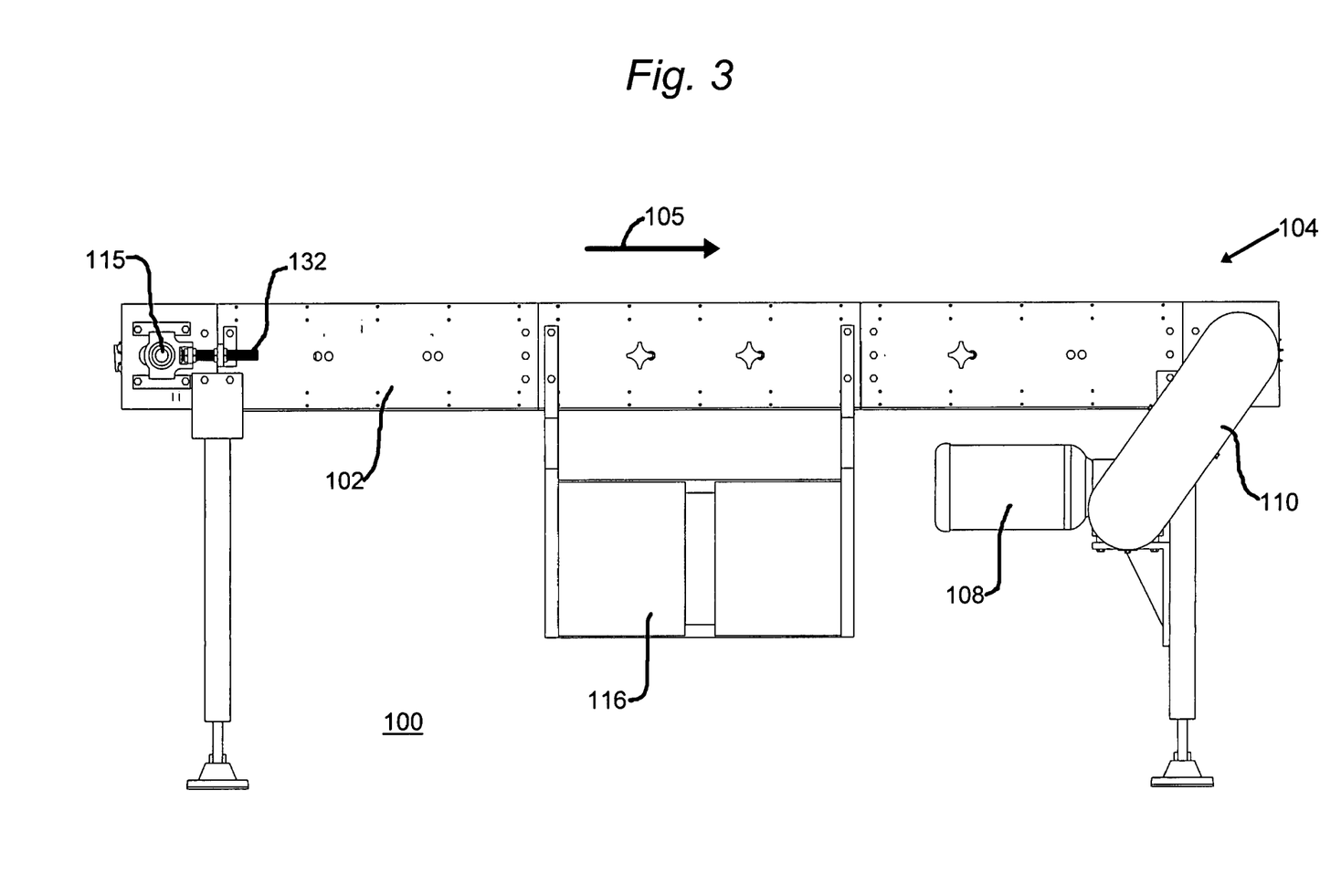
FIG. 3 is a simplified schematic side plan representation of the combiner conveyor arrangement of FIG. 1.

FIG. 3 is a simplified schematic side plan representation of combiner conveyor arrangement 100. Elements of structure that have previously been discussed are similarly designated. This figure shows that the alignment of axle 115 (shown in end view in this figure) is adjustable by actuation of a threaded alignment arrangement 132.

Figure 4:
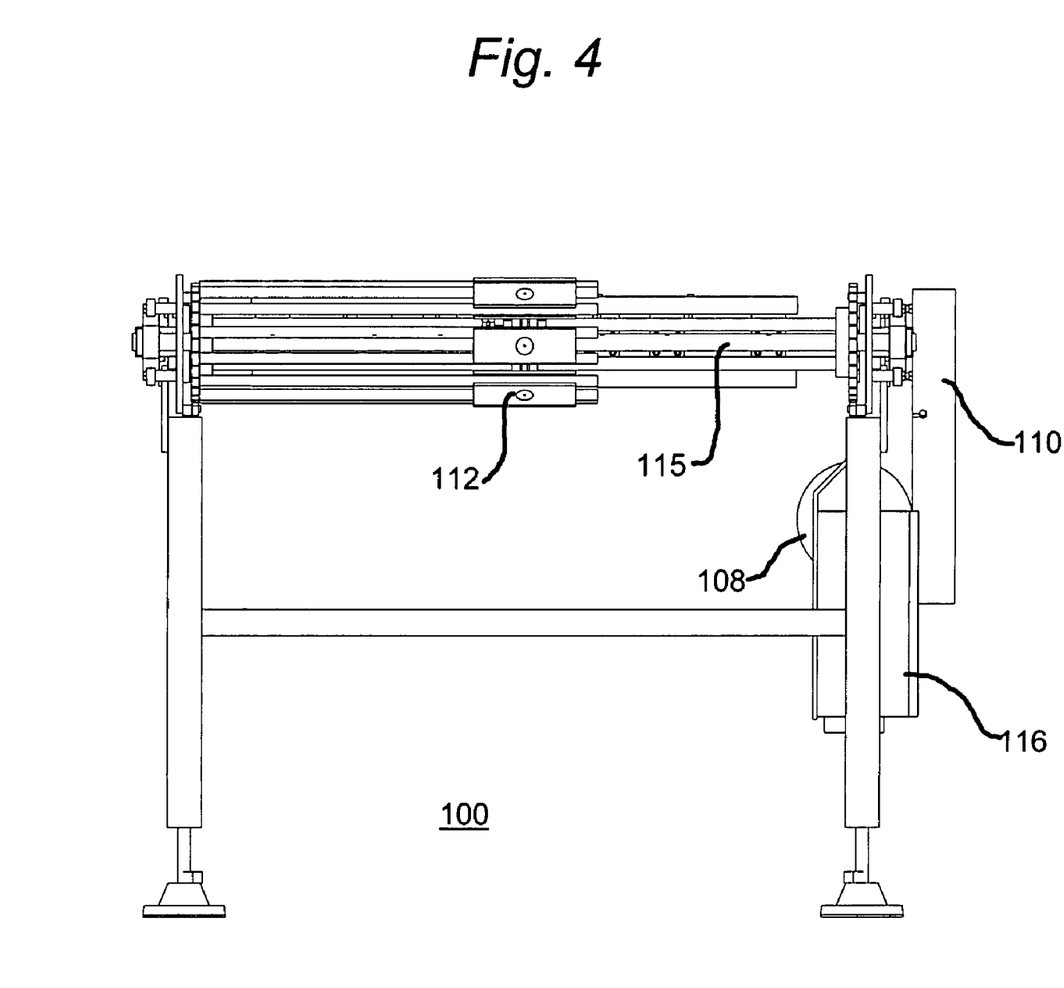
FIG. 4 is a simplified schematic end plan representation of the combiner conveyor arrangement of FIG. 1.

FIG. 4 is a simplified schematic end plan representation of combiner conveyor arrangement 100. Elements of structure that have previously been discussed are similarly designated. This figure illustrates that conveyor elements 112 are circulated beneath axle 115.

Figure 5:
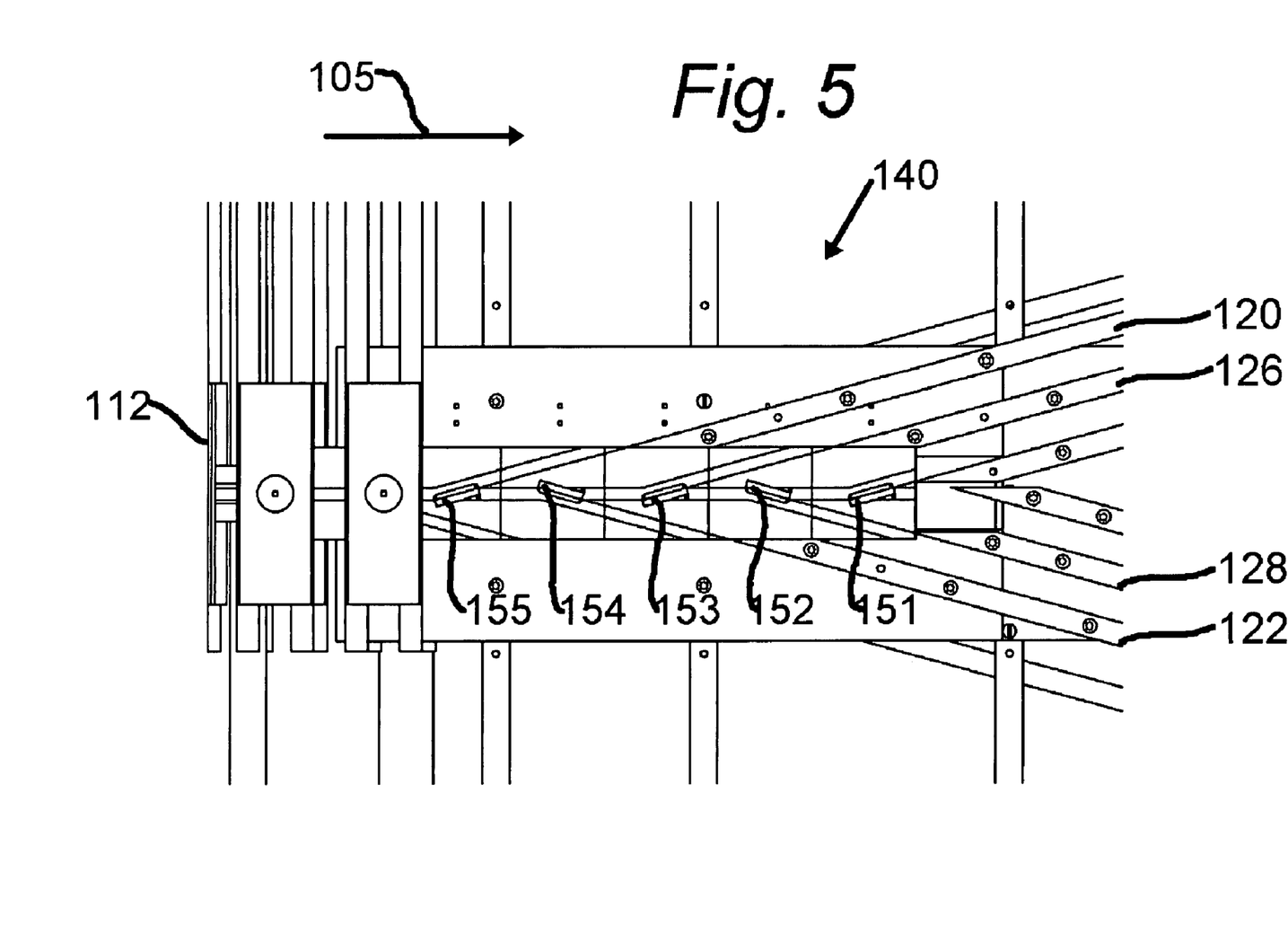
FIG. 5 is a simplified enlarged schematic top plan representation of the combiner portion of the combiner conveyor arrangement of FIG. 1.

FIG. 5 is a simplified enlarged schematic top plan representation of combiner portion 140 of combiner conveyor arrangement 100. Elements of structure that have previously been discussed are similarly designated. There are shown in this figure a plurality of switching fingers 151, 152, 153, 154, and 155. As depicted, the switching fingers are deployed to enable passage of articles of product (not shown) that are conveyed along guide ways 120 and 126. Any articles of product (not shown) that are conveyed along guide ways 122 and 128 are blocked by switching fingers 151 and 153. The switching fingers are actuatable to reverse position (not shown in this figure) whereby the articles of product (not shown) that are conveyed along guide ways 120 and 126 are blocked by switching fingers 151 and 153. In this specific illustrative embodiment of the invention, switching fingers 151 and 153 are actuated in synchrony, as are switching fingers 152, 154, and 155.

Figure 6:
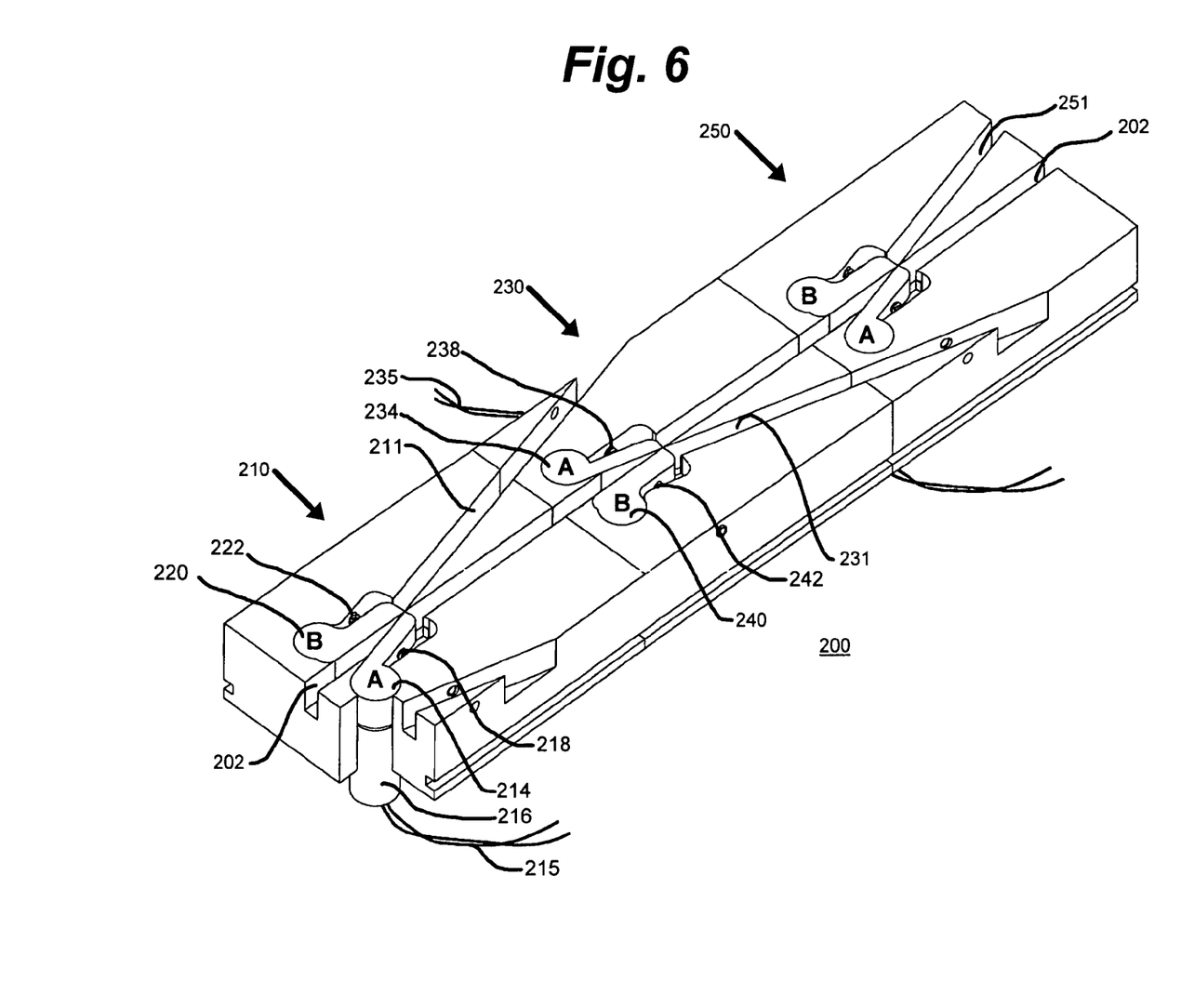
FIG. 6 is a perspective representation of a controllable product path switching arrangement constructed in accordance with the principles of the invention.

FIG. 6 is a perspective representation of a controllable product path switching arrangement 200 constructed in accordance with the principles of the invention. In this figure, there are shown three switching stations that are generally designated 210, 230, and 250. The switching stations select from among several alternative product pathways for a conveyed product (not shown in this figure). The selectable pathways include a central product path 202, and product pathways 211, 231, and 251, associated with respective ones of the switching stations. Central product path 202 is disposed in this specific illustrative embodiment of the invention substantially longitudinally along product path switching arrangement 200. Product pathways 211, 231, and 251 constitute, in this embodiment, selectable diversions from central path 202.

Referring to switching station 210, the conveyed product enters central product path 202 and first encounters a gate system having a rotatably displaceable gate 214, that in this figure is additionally identified as a type "A" gate. Gate 214 has rotatable positions that are locked in place by a locking electromagnet 216 that is itself controlled by the application of electrical energy at electrical leads 215. In addition, gate 214 is urged in the counter-clockwise direction by a resilient biasing element, which in this embodiment is a spring 218.

There is additionally provided in the gate system shown in this figure a further gate 220, that is characterized as a type "B" gate, and in this embodiment is free in that it is not controlled by an electromagnet. Gate 220 is urged in the clockwise direction by a further resilient biasing element, specifically a spring 222.

The gate system is shown in this figure to be in a condition wherein product (not shown) is diverted from the central path. More specifically, if electromagnet 216 is energized so as to lock gate 214 in the position shown, conveyed product is directed by gate 214 from central path 202 to pathway 211. As the product passes between gates 214 and 220, gate 220, which is not locked, but instead is substantially free, is urged against the resilient force of spring 222, thereby permitting the product to be redirected to pathway 211.

Alternatively, gate 214 can, in some embodiments, be locked by electromagnet 216 in the clockwise position whereby it is nested against spring 218 in the recess (not specifically designated) shown in the figure. In this condition, which is not the condition shown in the drawing, the conveyed product would continue along central path 202 to switching station 230. At switching station 230, type "A" gate 234 is shown in a clockwise position and, if locked in that position by the application of electrical energy at electrical leads 235 to energize an associated electromagnet (not shown), the product will be diverted to pathway 231.

Figure 7:
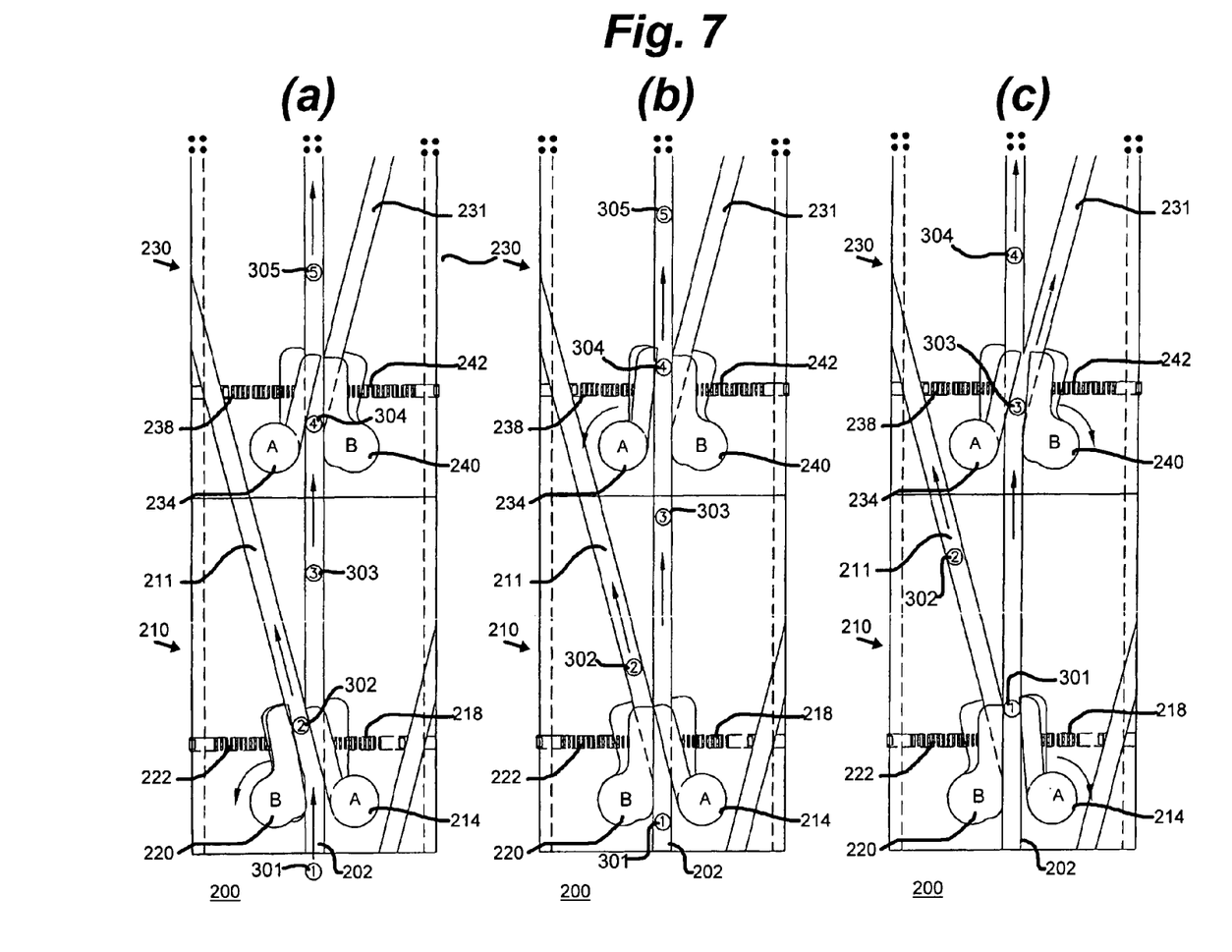
FIGS. 7(a), 7(b), and 7(c) are plan representations of respective product path redirection conditions responsive to corresponding switching states of the controllable product path switching arrangement of FIG. 6.

In a further embodiment, at each of the switching stations, as will be described below in relation to FIG. 7, the springs that bias the type "B" gates are stronger than the springs that bias the type "A" gates. More specifically, in the case of switching station 210, spring 222 applies a stronger resilient force than spring 218. Similarly, in switching station 230, spring 242 applies a stronger resilient force than spring 238. Thus, referring once again to the condition of switching station 210, if gate 214 is not locked by electromagnet 216, the product will displace gate 214, because it is urged by weaker spring 218, and the product therefore will continue along central path 202 rather than be diverted to pathway 211, as hereinabove described. This embodiment, which uses springs of differing strengths, advantageously requires locking of the type "A" gates in only one position. More specifically, when the type "A" gate is locked, the product is diverted, and when it is not locked, the product is not diverted.

FIGS. 7(a), 7(b), and 7(c) are plan representations of respective product path redirection conditions responsive to corresponding switching states of controllable product path switching arrangement 200, shown in FIG. 6. Elements of structure that have previously been discussed are similarly designated in this figure. In FIGS. 7(a), 7(b), and 7(c), only switching stations 210 and 230 are shown. There are additionally shown in this figure a plurality of products to be conveyed 301, 302, 303, 304, and 305. In this specific illustrative embodiment of the invention, each such product may be a puck pin.

Referring to FIG. 7(a), gate 214, which is a type "A" gate, is in a locked condition by operation of electromagnet 216 (not shown in this figure), Gate 220 is rotated counter-clockwise by the passage of conveyed product 302, as indicated by the associated arrow. More specifically, as conveyed product 302 passes between gates 214 and 220, gate 220 is maintained in the position shown by operation of the electromagnet, notwithstanding that, as previously described, spring 218 is weaker than spring 222. Thus, as noted, gate 220, which is a type "B" gate, is rotated and product to be conveyed 302 is directed onto pathway 211.

The conveyance of product along central path 202 is continued until, as shown product to be conveyed 304 is conveyed between gates 234 and 240. Here, gate 234 is not locked, i.e., the associated electromagnet (not shown) is not energized, and accordingly, the passage of product to be conveyed 304 between gates 234 and 240 causes gate 234, which has the weaker associated spring, to be displaced counter-clockwise. This permits product to be conveyed 304 ro continue along central path 202, as shown in FIGS. 7(b) and 7(c).

Referring to FIGS. 7(b) and 7(c), product to be conveyed 301 is urged between gates 214 and 220. In these figures, gate 214 is not locked, and therefore this gate, because of its weaker biasing spring, is rotatively displaced in the clockwise direction, as shown in FIG. 7(c). Thus, product to be conveyed 301 continues along central path 202. In addition to the foregoing, product to be conveyed 303, which is shown in FIG. 7(b) to be in central path 202, is conveyed between gates 234 and 240 in FIG. 7(c). In FIG. 7(c), gate 234 is in locked condition by operation of its associated electromagnet (not shown), whereby gate 240 is rotated clockwise to enable product to be conveyed 303 to be conveyed onto pathway 231.

FIGS. 8(a), 8(b), 8(c), and 8(d) are plan representations of respective switching states of a further specific illustrative embodiment of the invention designated as switching station 400. As shown in this figure, switching station 400 has a central path 402 that extends longitudinally along the shown length of switching station 400. There is additionally provided a diverted pathway 404 in switching station 400. A gate 410 has a lobe 412 and is arranged to be pivotable about a pivot point 414. An electromagnet 420 (shown schematically in phantom) serves to lock gate 410 in a predetermined position, as will be described in detail hereinbelow.

Figure 8:
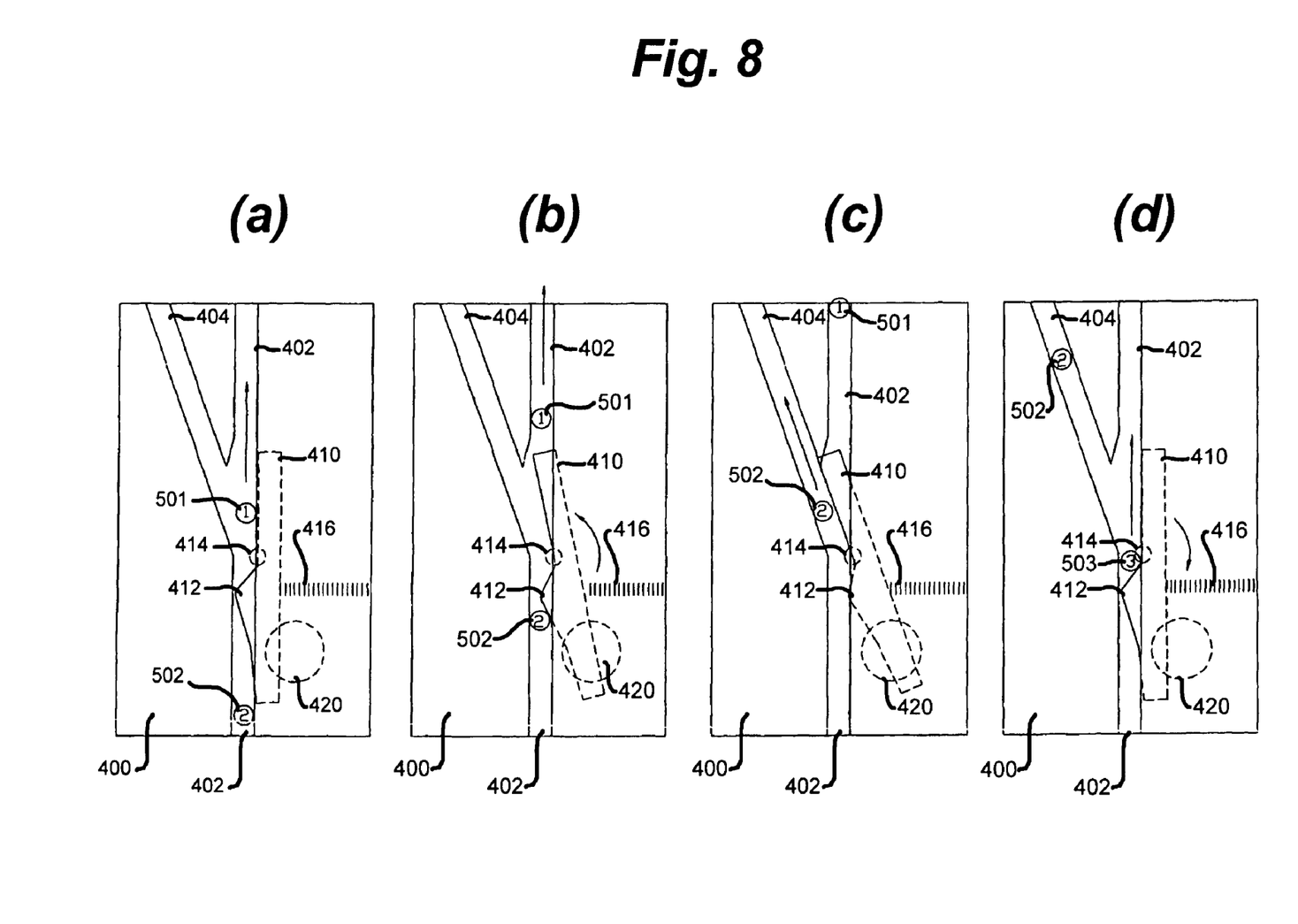
FIGS. 8(a), 8(b), 8(c), and 8(d) are plan representations of respective switching states of a further specific illustrative embodiment of the switching system aspect of the invention.

In FIG. 8(a), products to be conveyed 501 and 502, which may be puck pins in some embodiments of the invention, are being conveyed along central path 402 in the direction of the arrow shown in this figure. In FIG. 8(b), product to be conveyed 502 is urged against lobe 412 whereupon gate 410 is rotated counter-clockwise about pivot point 414 against the resilient biasing force exerted by a resilient biasing element in the form of a spring 416. Once fully displaced rotatively, gate 410 is locked in the displaced condition by operation of electromagnet 420. Such locking causes product to be conveyed 502 to be diverted onto pathway 404, as shown in FIG. 8(c).

FIG. 8(d) shows the condition where product to be conveyed 503 has been urged against lobe 412, gate 410 becomes displaced counter-clockwise, as shown in FIG. 8(c), but electromagnet 420 is not engaged. Therefore, gate 410 is restored to its original position (as in FIG. 1), by operation of a resilient biasing element in the form if spring 416, in this embodiment. Thus, since electromagnet 420 is not engaged, product to be conveyed 503 is not diverted to pathway 404, but instead continues to be conveyed along central path 402.

Although the invention has been described in terms of specific embodiments and applications, persons skilled in the art may, in light of this teaching, generate additional embodiments without exceeding the scope or departing from the spirit of the claimed invention. Accordingly, it is to be understood that the drawing and description in this disclosure are proffered to facilitate comprehension of the invention, and should not be construed to limit the scope thereof.

What is claimed is:

1. A combiner conveyor arrangement for conveying articles of product, the combiner conveyor arrangement comprising:
    a first conveyor for urging a first plurality of the articles of product in a first predetermined direction of travel;
    a plurality of first guide ways arranged substantially along the first predetermined direction of travel for directing the first plurality of the articles of product in a corresponding plurality of substantially parallel rows in response to the urging of the first plurality of the articles of product by said first conveyor;
    a combiner portion for conveying the first plurality of the articles of product in a combiner direction of travel transverse to the first direction of travel; and
    a first plurality of switching arrangements for controlling the passage of selected ones of the first plurality of the articles of product between respectively associated ones of said plurality of first guide ways and said combiner portion.

2. The combiner conveyor arrangement of claim 1, wherein there is further provided:
    a second conveyor for urging a second plurality of the articles of product in a second predetermined direction of travel;
    a plurality of second guide ways arranged substantially along the second predetermined direction of travel for directing the second plurality of the articles of product in a corresponding plurality of substantially parallel rows in response to the urging of the second plurality of the articles of product by said second conveyor; and
    a second plurality of switching arrangements for controlling the passage of selected ones of the second plurality of the articles of product between respectively associated ones of said plurality of second bilateral guide ways and said combiner portion.

3. The combiner conveyor arrangement of claim 2, wherein each of said first and second pluralities of switching arrangements comprises an associated one of a plurality of actuatable fingers for selectably blocking and opening an associated one of said first and second pluralities of guide ways.

4. The combiner conveyor arrangement of claim 3, wherein the actuatable fingers of said first and second pluralities of switching elements are arranged to operate synchronously.

5. The combiner conveyor arrangement of claim 1, wherein said plurality of first guide ways each comprise a pathway having lateral guides.

6. The combiner conveyor arrangement of claim 2, wherein the first predetermined direction of travel of said first longitudinal conveyor is in a direction of convergence with the second direction of travel of said second longitudinal conveyor.

7. The combiner conveyor arrangement of claim 6, where said combiner portion comprises a discharge conveyor for receiving the first and second pluralities of the articles of product in single file arrangement downstream of said first and second pluralities of switching arrangements.

8. A method of forming a single file discharge of articles of product, the method comprising the steps of:
    first urging a first plurality of the articles of product in substantially parallel relation to one another in a first direction of travel;
    second urging a second plurality of the articles of product in substantially parallel relation to one another in a second direction of travel;
    guiding the first and second pluralities of the articles of product along first and second bilateral paths toward a region of convergence in response to said steps of first and second urging; and
    switching between said first and second bilateral paths to form the single file discharge of articles of product.

9. The method of claim 8, wherein said step of switching comprises the steps of:
    actuating a first plurality of fingers for controlling the discharge of the first plurality of products to form a single file discharge of the first plurality of articles of product; and
    actuating a second plurality of fingers for controlling the discharge of the second plurality of products to form a single file discharge of the second plurality of articles of product.

10. The method of claim 9, wherein said steps of actuating a first plurality of fingers and actuating a second plurality of fingers are performed synchronously.

11. A switching arrangement in a switching station of a conveyor for directing a product being conveyed to a selectable one of plurality of selectable conveyance pathways, the switching arrangement comprising:
    a gate disposed in the vicinity of the intersection of the selectable conveyance pathways, the gate being pivotally displaceable about a pivot point from a first position to a second position in response to the conveyance of the product being conveyed; and
    an electromagnet for locking said gate.

12. The switching arrangement of claim 11, wherein said gate is provided with a lobe portion for communicating with the product being conveyed.

13. The switching arrangement of claim 11, wherein there is further provided a resilient biasing element for restoring said gate to the first position.

14. The switching arrangement of claim 13, wherein said resilient biasing element is a spring.

15. The switching arrangement of claim 13, wherein there is further provided a further gate disposed in the vicinity of the intersection of the selectable conveyance pathways, the further gate being pivotally displaceable about a pivot point from a respective first position to a respective second position.

16. The switching arrangement of claim 15, wherein there is provided a further resilient biasing element for restoring said further gate to the respective first position.

17. The switching arrangement of claim 16, wherein said further resilient biasing element is configured to apply a stronger resilient biasing force than said resilient biasing element.

* * * * *